United States Patent
Spiero et al.

[11] Patent Number: 5,936,618
[45] Date of Patent: Aug. 10, 1999

[54] INFORMATION DISPLAY DEVICE WITH ADAPTIVE SCROLL SPEED

[75] Inventors: Richard Cees Spiero, Eindhoven; Henricus J. Kunnen, Valkenswaard, both of Netherlands

[73] Assignee: U.S. Philips Corporation, New York, N.Y.

[21] Appl. No.: 08/800,438

[22] Filed: Feb. 18, 1997

[30] Foreign Application Priority Data

Apr. 19, 1996 [EP] European Pat. Off. .............. 96201101

[51] Int. Cl.⁶ ................................ G09G 5/34; G09G 5/00
[52] U.S. Cl. ........................ 345/204; 345/123; 345/124; 345/125
[58] Field of Search ................................... 345/123, 124, 345/125, 157, 159, 173, 204

[56] References Cited

U.S. PATENT DOCUMENTS

| | | | |
|---|---|---|---|
| 4,952,927 | 8/1990 | DeLuca et al. | 340/792 |
| 4,954,967 | 9/1990 | Takahashi | 345/173 |
| 5,374,942 | 12/1994 | Gilligan et al. | 345/123 |
| 5,434,591 | 7/1995 | Goto t al. | 345/123 |
| 5,495,566 | 2/1996 | Kwatinetz | 395/123 |
| 5,530,455 | 6/1996 | Gillick et al. | 395/123 |

FOREIGN PATENT DOCUMENTS

0325325A2  7/1989  European Pat. Off. .

*Primary Examiner*—Vijay Shankar
*Attorney, Agent, or Firm*—Michael E. Belk

[57] ABSTRACT

An information display device with adaptive scroll speed receives at its input (1a, 1b) messages in the form of bursts of information units. The display device comprises presentation apparatus (2), coupled to the input, comprising a display area (2.1) for displaying the messages. The presentation apparatus can scroll the information units through the display area at a specific scroll speed. The information display device further comprises a control signal generator (3) that generates a control signal which is derived from the average rate at which information units are received. The presentation apparatus control the scroll speed in response to the control signal.

22 Claims, 6 Drawing Sheets

INFORMATION DISPLAY DEVICE WITH ADAPTIVE SCROLL SPEED

BACKGROUND OF THE INVENTION

This invention relates to an information display device, comprising:
  input means for receiving bursts of information units,
  presentation means comprising a display area for displaying said information units, said presentation means being adapted for scrolling the information units through the display area at a specific scroll speed, Information display devices are applied in apparatuses that can, in general, be divided into two classes:
1. Apparatuses that contain all information within the apparatus itself. In these, the rate at which information is presented on the display can be under the full control of its user. An example of this is a Personal Organiser; the user can browse through the information contained in the Organiser at his own preferred speed.
2. Apparatuses that rely on information which becomes available at a rate that cannot be fully controlled by the apparatus or its user. In these, the speed at which information is presented on the display is often dictated by the rate at which information is received from the source. Examples of this are a receiver for broadcast messages and a song text display coupled to a Digital Compact Cassette (DCC) player or to a Digital Audio Broadcasting (DAB) receiver.

The invention relates to an information display device for use in an apparatus of this second class. An example of a display device for presenting, e.g. song texts, is disclosed in European Patent Application 0 561 435. In this document, a solution is sought for the problem that the display area is often insufficient to present a received message in full. A conventional way of presenting a long textual message on such a small display is by scrolling the message through the display area, i.e. part of the text is shifted through the display area while successive characters (or lines of text) from the message are added at one end of the display area and preceding characters (or text lines, respectively) are removed at the other end. The speed at which a message is scrolled is usually fixed or determined by special codes contained in the message, such that an average user finds the reading speed acceptable.

SUMMARY OF THE INVENTION

It is an object of the present invention to provide an information display device with an improved way of presenting messages the length of which may exceed the display capacity.

The information display device according to the present invention is characterized in that the information display device further comprises:
  control signal generator means for generating a control signal, said control signal generator means comprising evaluation means that are adapted for generating an evaluation signal representative of an average rate at which said information units are received at said input means, said control signal being derived from said evaluation signal, and in that said presentation means are adapted for controlling the scroll speed in response to said control signal. The present invention is based on the following insight: When information units are received separately at more or less regular intervals, each information unit can immediately be scrolled into the display area. Thus, the scrolling can be controlled directly by the reception of individual information units. In many information transfer systems, however, a whole message, comprising a plurality of information units, is conveyed in a very short time, for instance in a data packet. Various types of data packets may be conveyed, some comprising information units that are to be presented on the display, while others convey other information, like for instance data that is (currently) not relevant for the display device. The receiving apparatus usually comprises a decoding device that decodes these data packets (insofar necessary), filters out non-relevant data and passes to the display device only those information units that are currently to be presented. Thus, information units are received by the display device in short bursts at a high momentary reception rate. In such a system, it would be most disadvantageous if the scrolling were controlled directly by the reception of individual information units; the message conveyed in the data packet would scroll into the display area at high speed and, if the length of the message exceeds the display capacity, the beginning of the message would scroll out almost immediately. Only the end of the message would remain visible in the display for some time, until a next message is received. Consequently, a lower scroll speed is desirable so that the beginning of the message can also be read comfortably. To this end, a FIFO-type (First In, First Out) of buffer can be applied which is filled with the information units at the high momentary rate at which these are received and which emits the information units at a much lower (predetermined) rate, corresponding to a comfortable scroll speed. There may, however, be large variations in what individual users find as a comfortable scroll speed; some users can absorb information at quite a high speed while others need much more time. To satisfy almost all users, the scroll speed must be rather low. Then, it may happen that a new message is received when the previous message is still scrolling through the display and part of it has not yet been shown. In this situation, either the new message must be stored for later presentation, thereby losing its exact timing and risking the loss of the message due to limited storage capacity in the buffer, or the presentation of the previous message must be aborted, leaving part of that message unseen. Both solutions are objectionable. The present invention discloses another solution, that is particularly advantageous when the messages have a strong real-time character, like for instance the text lines of a song text that should be presented coinciding with the lines being sung. According to the present invention, the scroll speed is controlled in response to a control signal that is derived from the average rate at which information units are received by the display device. Thus, the scroll speed is low when, for instance, a slow ballad is played, and high when, for instance, a fast rap-song is played.

An information unit is defined as a group of data-bits that represents a displayable element, like for instance an alphanumeric character, a Hanji character, a line of text or a series of pixels, or any other displayable element that can be scrolled into the display area, separately. For the sake of clarity, this definition emphasizes the formal distiction between information units and displayable elements. It is, however, more common not to make this distiction and to speak of "the display showing the information units", rather than "the display showing the displayable elements represented by the information units". In this document, too, the term "information unit" is used for both the group of data-bits and for the displayable element it represents.

The definition of an information unit is thus related to the type of display that is used. For a display that can present a single line of text on discrete character positions, for instance by applying the well-known 16-segment representation of characters, an information unit is one character-code as this type of display would present a long line of text by scrolling characters one by one into its display area at one end, usually the right-hand side, while preceding characters are shifted through the display area and finally removed at the other end, in casu the left-hand side. If the single-line text display is of a dot-matrix type, capable of showing characters proportionally spaced and scrolling dot-columns rather than full characters, an information unit corresponds to one dot-column and consequently the number of information units per character-code varies with the width of the character. For a display that can present a plurality of text lines, like for instance a television or computer screen, an information unit corresponds to a full line of text as this type of display would present a long text by scrolling text lines one by one into its display area at one end, usually the lower side, while preceding lines of text are shifted through the display area and finally removed at the other end, in casu the upper side. Similarly, for other types of displays, like for instance a graphical image display, an information unit corresponds to the smallest element that is scrolled into the display area, separately. The invention is not restricted to information display devices comprising a display of any particular type; it is applicable for single-line and multi-line text displays, for graphical image displays and for any other type of display device that is adapted for scrolling information units through its display area.

The scroll speed can be defined as the number of information units that are scrolled into the display area per unit of time. By applying this definition, the scroll speed is expressed in the same units of measurement as the rate of reception, e.g. characters per second.

An embodiment of the invention may be characterized in that said evaluation means are adapted for averaging during specific periods of time, the "evaluation periods", and for generating said evaluation signal which is representative of an average rate at which said information units are received during an evaluation period. The evaluation periods are subsequent, but not necessarily consecutive periods of time; between the evaluation periods there may be "blind" periods during which the rate of reception is not evaluated. Such "blind" periods may be necessary in implementations that have a limited processing capacity. After an evaluation period, the evaluation means generate an evaluation signal that represents the average rate of reception during that evaluation period. In an embodiment of the invention the evaluation signal is provided, as the control signal, to the presentation means. Thus, the scroll speed is controlled in such a way that it follows the average reception rate. This simple way of controlling the scroll speed is adequate when the average rate of reception is rather constant, but a sudden increase in the reception rate will cause an increase in the scroll speed that is insufficient to compensate for the lag caused by the scroll speed being too low, thus losing either part of a message or the exact timing of the presentation. To avoid such adverse effects, an embodiment of the invention may further be characterized in that said control signal generator means further comprise signal processing means that are adapted for generating said control signal in response to said evaluation signal and a control signal that was generated previously. In this way, the evaluation signal is not provided directly to the presentation means, but processed first by signal processing means. The resulting control signal is dependent also on a previous control signal, so that sudden differences between the reception rate and the scroll speed can be recognised and taken into account in generating the control signal.

An embodiment as described hereinabove, in which the control signal generator means comprise evaluation means that average the rate of reception during evaluation periods, may be further characterized in that said control signal generator means further comprise signal processing means that are adapted for generating, after an evaluation period, said control signal in response to the sum of said evaluation signal multiplied by a first modification factor ($\alpha$) and a preceding control signal multiplied by a second modification factor ($\beta$). Thus, the control signal is generated, after an evaluation period, in response to the weighted sum of signals that represent the average rate of reception during that evaluation period and the scroll speed in that period. The setting of the modification factors $\alpha$ and $\beta$ controls the response of the control signal to changes in the average rate of reception, and consequently the response of the scroll speed. To acquire a desirable response, a preferred embodiment may be further characterized in that the signal processing means are further adapted for setting the first modification factor to a value in the range $0 \leq \alpha \leq 1$ if the average rate of reception during a preceding evaluation period was lower than the scroll speed in that period, for setting the first modification factor to a value $\alpha > 1$ if the average rate of reception during a preceding evaluation period was higher than the scroll speed in that period, and for setting the second modification factor to a value substantially equal to one minus the first modification factor (i.e. $\beta = 1 - \alpha$). Thus, the modification factor $\alpha$ (and with that the modification factor $\beta = 1 - \alpha$) is adapted to the situation to get a desirable response as follows:

if the average rate of reception is lower than the scroll speed, the control signal must follow slowly, i.e. a low-pass characteristic. If the modification factor $\alpha$ is set to a very small value, i.e. close to zero, a decrease in the average rate of reception is followed very slowly, which is advantageous if the scroll speed was already not too high for reading. Once the scroll speed is so low that lowering it further does not improve the readability of the presented messages, or may even adversely affect the understandability of the full message, the modification factor is set to $\alpha = 0$. If, on the other hand, the scroll speed was high (with respect to a convenient reading speed) when the average rate of reception decreases, it is more advantageous to follow that change rapidly, i.e. by setting the modification factor $\alpha$ equal to 1 or a bit smaller than 1. In that way, the scroll speed is lowered as soon as possible, thereby quickly improving the readability of the presented messages.

if the average rate of reception is higher than the scroll speed, the control signal must follow rapidly and preferably with an "overshoot", i.e $\alpha > 1$, to compensate for the scroll speed being too low during the preceding period. The amount of overshoot can be optimized by taking into account how many information units of the previous message are still to be shown when a next message is received. After reacting upon an increased reception rate by producing an overshoot in the scroll speed, thus quickly reducing the lag in the presentation, the low-pass characteristic described hereinabove will make the scroll speed slowly approach the new reception rate.

As a further refinement, these embodiments may be characterized in that the signal processing means are further adapted for setting the modification factors to the values $\alpha=0$ and $\beta=1$ if the average rate of reception during a preceding evaluation period was less than a predetermined fraction lower than the scroll speed in that period. In this way, the scroll speed is kept at a constant level if it is high enough to show the full messages in the available time, and not much higher than required for that. This makes the presentation of messages more steady than when the scroll speed responds to every small change (or measuring inaccuracy) in the evaluation signal. The predetermined fraction determines how much higher the scroll speed may be without being decreased; a fraction of about 10% may in practise prove sufficient to avoid unsteady presentation.

Evaluation means that average the rate of reception during evaluation periods may be adapted for evaluating the number of information units received in the evaluation period divided by the duration of the evaluation period. Thus, two parameters must be evaluated by the evaluation means: said number of information units and said duration. Preferred embodiments of the invention make use of a priori knowledge of at least one of these parameters to simplify the evaluation. Such a preferred embodiment may be characterized in that said evaluation periods have a fixed duration, in which case that duration need not be evaluated, or it may be characterized in that the beginning and ending of said evaluation periods are controlled in response to the reception of a burst of information units. In information transfer systems that convey data packets, usually each data packet either provides information about the number of information units that is carried in the packet, or carries a predetermined number of information units. In both of these cases, the number of information units in the burst need not be evaluated. The European Patent Application 0 325 325, for instance, discloses a system in which a message is carried in a data packet comprising a predetermined number of 40 information units. If this embodiment is applied in such a system, the evaluation means may be adapted for evaluating the average rate at which data packets are received, rather than evaluating the average reception rate of individual information units. If the information units that are to be presented as a single message are received in a plurality N of bursts, the ending of an evaluation period may be controlled by the moment at which the $N^{th}$ burst is received since the beginning of that evaluation period.

An embodiment of the invention may further comprise buffer means that are adapted for storing information units at the rate at which they are momentarily received at the input means and for emitting information units at a rate related to the scroll speed. This FIFO-type (First In, First Out) of buffer is filled, at a high momentary rate, with the information units comprised in a burst. The buffer is emptied at a much lower but substantially continuous rate by emitting information units for scrolling into the display area. Preferably, the storage capacity of the buffer is large enough to avoid the loss of information units when a new message is received before the buffer is emptied, i.e. before the previous message is emitted completely. The preferred storage capacity is mainly related to the number of information units comprised in a message; a buffer large enough to hold two messages is, in most practical situations, large enough to avoid said loss of information units. If the control signal generator means comprise signal processing means as described hereinabove, the chance that information units are lost is further reduced if the modification factor $\alpha$ is set to a value larger than one when the rate of reception increases.

(The modification factor $\beta$ is assumed to be set to $\beta=1-\alpha$.) Consequently, a smaller buffer capacity may be chosen.

When the average rate of reception is substantially lower than the acceptable scroll speed, the buffer may be applied also to preserve a message until the next message is received, so that a message can be presented repeatedly on the display.

The information display device according to the invention may be comprised in an apparatus that is adapted for reproducing information from a record carrier, such as a CD player or a DCC player, or be comprised in an apparatus that is adapted for receiving broadcast transmissions, such as a radio or a receiver for paging messages. The term broadcast transmissions in this sense is not restricted to wireless communication or public services. Also communication over wires or any other medium, and communication to a single or a few users are within the scope of the invention.

It is noted here that a paging receiver with a dynamically allocated display rate is described in U.S. Pat. No. 4,952,927. That patent, however, does not disclose the scroll speed of messages being adapted to the rate at which information is received. In further contrast to that patent, the present invention discloses a display device that controls the scroll speed in such a way that the need for buffering a large number of received messages is avoided.

These and other aspects of the invention will be apparent from and elucidated with reference to the embodiment(s) described hereinafter.

BRIEF DESCRIPTION OF THE DRAWINGS

The invention will now be described in more detail, by way of example, with reference to the accompanying drawings, in which.

DESCRIPTION OF THE PREFERRED EMBODIMENTS

Figure 1:
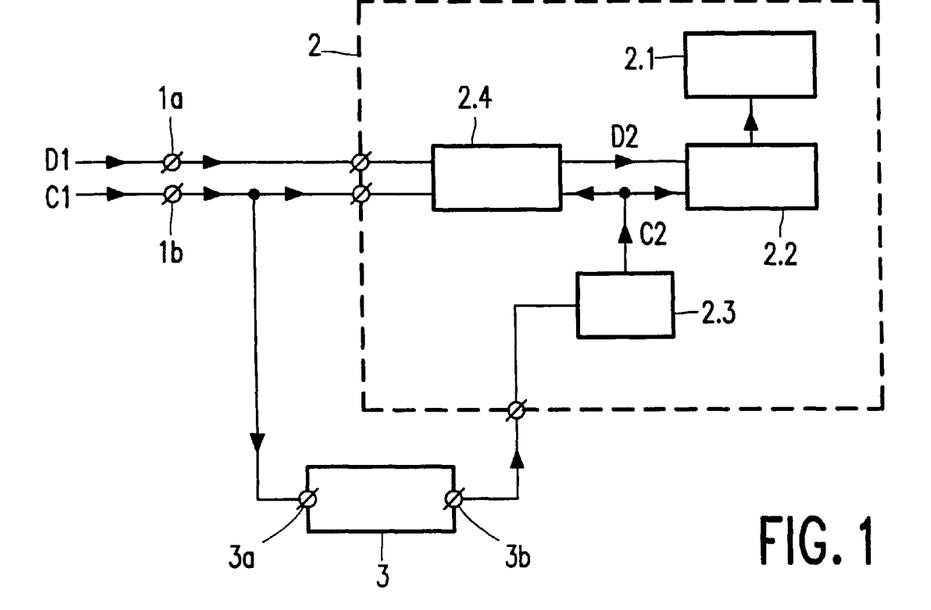
FIG. 1 shows an information display device according to the present invention.

FIG. 1 shows an information display device according to the present invention, comprising input terminals 1$a$ and 1$b$, presentation means 2 and a control signal generator 3. In this example, the apparatus in which the display device is incorporated comprises a decoding device (not shown) that receives a stream of data and retrieves from that stream the information units that are to be presented on the display. These information units are provided, by means of a data signal D1, to the display device at the rate at which they are retrieved from the data stream, i.e. in bursts, together with a synchronous clock signal C1. The clock signal C1 gives an indication, like for instance a rising edge, when an information unit is available on the data signal D1. Consequently, the clock signal C1 exhibits the same bursty character as the information units on the data signal D1. The bursts of information units are received by the display device at the input terminal 1a and the clock signal is received at the input terminal 1b. It is to be understood that the input terminal 1a may comprise a plurality of connections, for instance one for each of the bits that together form an information unit. The input terminals 1a and 1b are coupled to the presentation means 2. The information units are clocked into a FIFO-type buffer 2.4 in resonse to said rising edges in the clock signal C1. The information units are emitted from the buffer 2.4 and provided to a display driver circuit 2.2 at a substantially continuous rate that is controlled by a second clock signal C2 generated by a clock signal generator 2.3. The rate of the second clock signal C2 determines the scroll speed; the display driver circuit 2.2 loads, in reponse to an active edge of the second clock signal, an information unit from the buffer and scrolls it into the display area 2.1 while scrolling preceding information units through the display area. According to the present invention, the scroll speed can be controlled in response to a control signal. For that purpose, the clock signal generator 2.3 may, for instance, comprise a VCO (Voltage-Controlled Oscillator) that can be controlled by the control signal, or a programmable divider that provides a variable clock rate by dividing a high frequency by a factor derived from the control signal. The control signal is provided by a control signal generator 3 and is derived from an evaluation signal that represents the average rate at which information units are received. In this way, the information display device according to the present invention adjusts the speed at which information is presented to the average rate at which that information is received. Embodiments of the control signal generator 3 are described in the following Figures.

In the examples presented here, the control signal generator 3 applies the clock signal C1 for generating the evaluation signal, but it is to be understood that the data signal D1 or another signal that is related to the rate at which information units are received may equally well be applied. If, for instance, the information display device is applied in a system in which messages are conveyed in data packets, the control signal generator 3 may advantageously be adapted to the data-packet structure. If the data packets each provide a predetermined number of information units, the embodiments of the control signal generator 3 may be adapted for evaluating the average rate at which data packets are received, rather than evaluating the average reception rate of individual information units.

Figure 2:
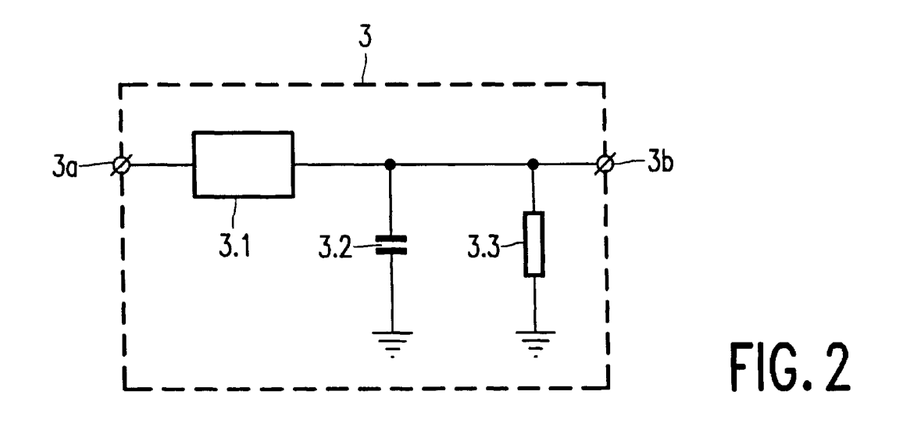
FIG. 2 shows a first embodiment of the control signal generator means.

FIG. 2 shows a first embodiment of the control signal generator 3 in analogue form. The control signal generator comprises a charge pump 3.1, a capacitor 3.2 and a resistor 3.3. It receives the clock signal C1 at its input 3a. The charge pump 3.1 provides a fixed charge to the capacitor 3.2 for every rising edge in the clock signal C1 This increases the voltage on the capacitor 3.2. However, the voltage is also decreased because the capacitor 3.2 is continuously discharged by the resistor 3.3. The resulting voltage on the capacitor 3.2 represents the average rate of the rising edges in the clock signal C1, which is the same as the average rate of the information units. Consequently, the voltage is the evaluation signal. The capacitor 3.2 can be coupled to the output 3b to provide the evaluation signal as the control signal to the presentation means 2, as shown in FIG. 2, or further signal processing means may be included (not shown), like for instance a low-pass filter for smoothening the control signal.

The embodiment of the control signal generator described with respect to FIG. 2 is not optimally fit for implementation in a digital integrated circuit or in a programmable digital device, such as a PLD (programmable logic device) or a micro-computer. The following embodiments are more suitable for such implementations.

Figure 3:
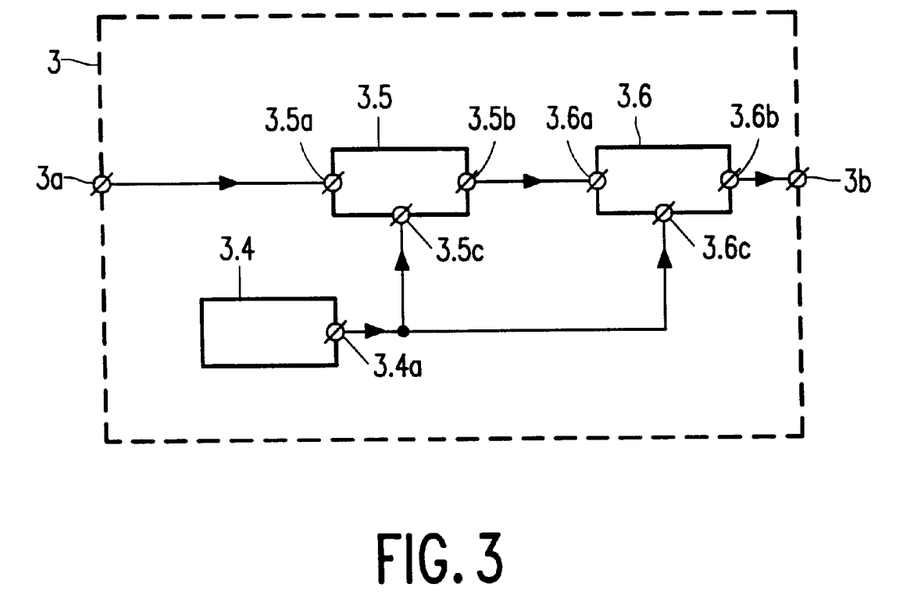
FIGS. 3 and 4 show embodiments of the control signal generator means suitable for implementation in digital form.

FIG. 3 shows an embodiment of the control signal generator means suitable for implementation in digital form. The control signal generator 3 receives the clock signal C1 at its input 3a. It comprises a fixed-interval timer 3.4 which generates, at regular intervals, a trigger signal at its output 3.4a, and a counter 3.5 which counts the number of rising edges in the clock signal C1 during a period between trigger signals, said period thus being the evaluation period. The count-value of the counter 3.5 at the instant of a trigger signal is thus a measure for the average rate at which rising edges in the clock signal C1 were received during that evaluation period, which is the same as the average rate of the information units. Consequently, the count-value at said trigger instance can be applied as the evaluation signal. For letting it control the scroll speed, that count-value must be preserved before the counter is reset. For that, the output 3.5b of the counter is coupled to the data input 3.6a of storage means 3.6 and the output 3.4a of the timer is coupled to the trigger input 3.6c of the storage means. Thus, at the instant of a trigger signal the count-value is stored in the storage means 3.6 and provided at the data output 3.6b. Then, the counter is reset by setting its count-value back to zero; the output 3.4a of the timer is further coupled to the reset input 3.5c of the counter. The data output 3.6b of the storage means is coupled to the output 3b to provide the preserved count-value as the control signal to the presentation means 2.

In this embodiment, the control signal is related in a straight-forward way to the number of information units received in a fixed period of time, resulting in the control signal being proportional to the average rate of reception during that period.

Figure 4:
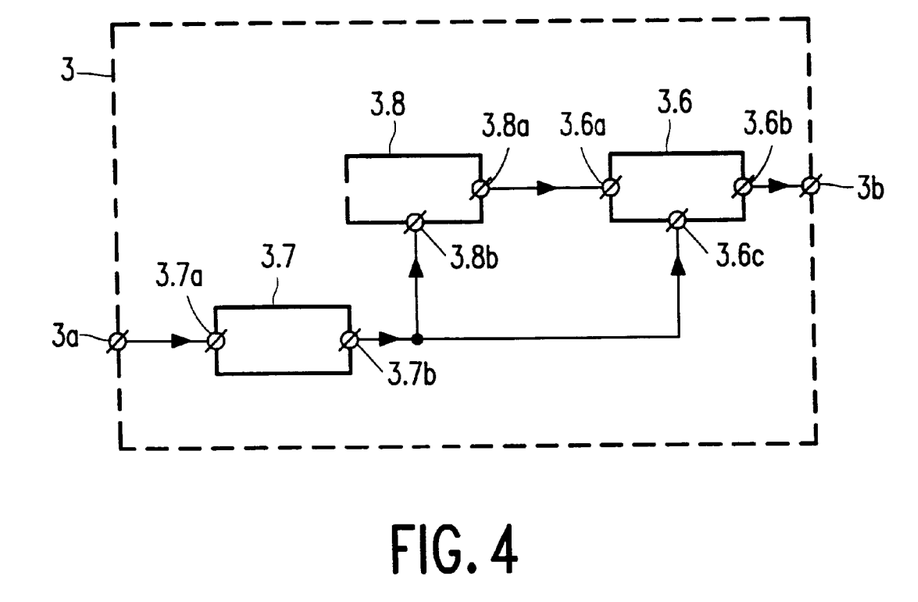

FIG. 4 shows another embodiment of the control signal generator means suitable for implementation in digital form. This embodiment is particularly useful when each message comprises a predetermined number of information units and is received in a single burst, e.g. from a single data packet. The control signal generator 3 comprises a detector 3.7 that detects the reception of a burst of information units and generates a trigger signal at its output 3.7b when such a burst is detected. Alternatively, such a trigger signal could be provided by a decoding device in the receiving apparatus upon detection of a data packet that is to be presented in the display. The control signal generator further comprises a counter 3.8 for timing the period between trigger signals, said period thus being the evaluation period. The counter 3.8 counts at a constant, relatively high rate; its count-value at the instant of a trigger signal is a measure of the duration of the evaluation period. Since a predetermined number of information units are comprised in a burst, this count-value also represents the average rate at which information units were received during that evaluation period. Consequently, the count-value at said trigger instance can be applied as the evaluation signal. For letting it control the scroll speed, that count-value must be preserved before the counter is reset. For that, the output 3.8a of the counter is coupled to the data input 3.6a of storage means 3.6 and the output 3.7b of the detector 3.7 is coupled to the trigger input 3.6c of the storage means. Thus, at the instant of a trigger signal the count-value is stored in the storage means 3.6 and provided at the data output 3.6b. Then, the counter is reset by setting its count-value back to zero. The output 3.7b of the detector is further coupled to the reset input 3.8b of the counter. The data output 3.6*b* of the storage means is coupled to the output 3*b* to provide the preserved count-value as the control signal to the presentation means 2. In this embodiment, the control signal is related in a straight-forward way to the duration of the interval between the moments at which a burst is detected, resulting in the control signal being inversely proportional to the average rate of reception during that interval.

Figure 5:
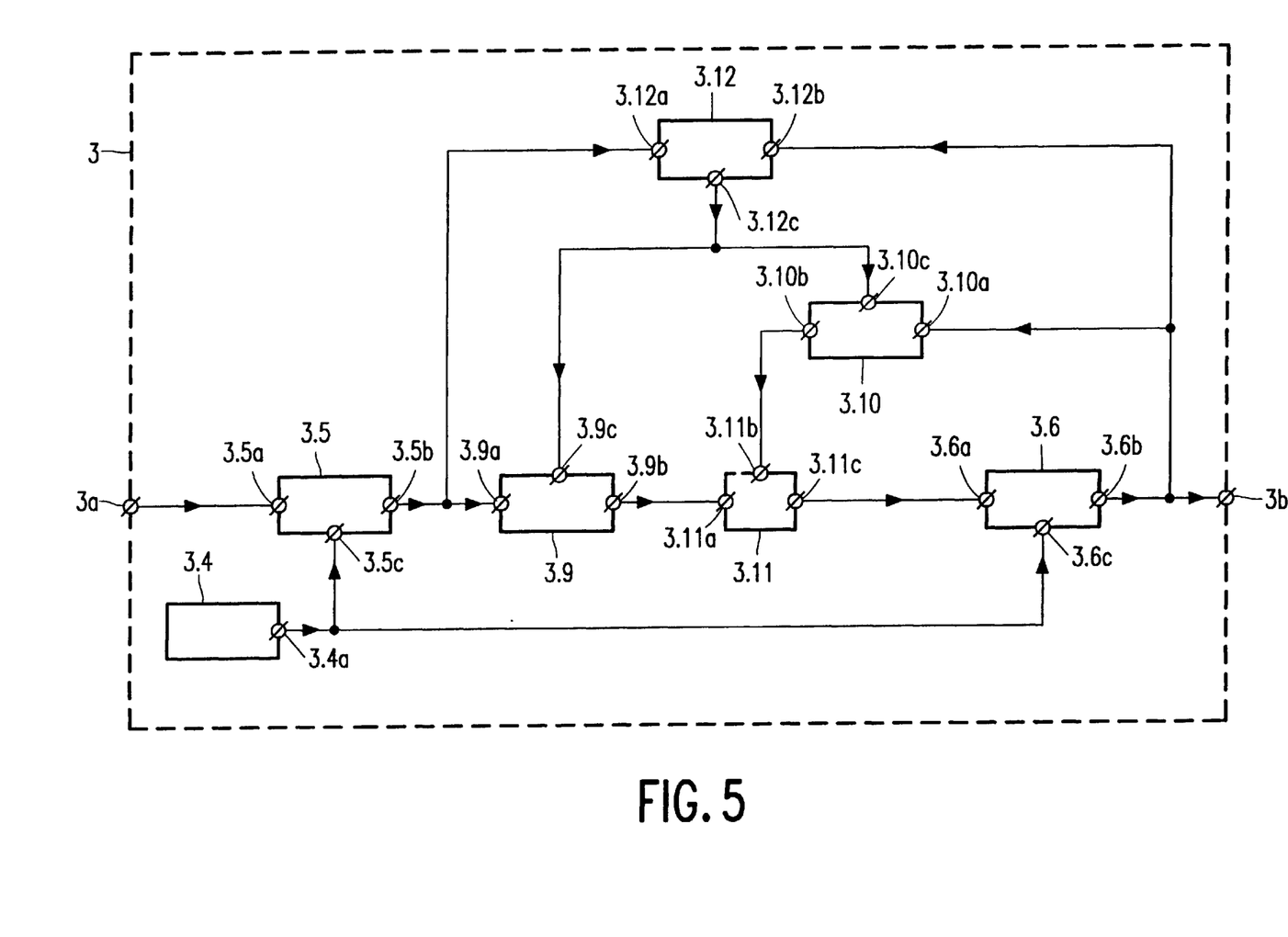
FIGS. 5 and 6 show embodiments of the control signal generator means that comprise further signal processing means.
Figure 6:
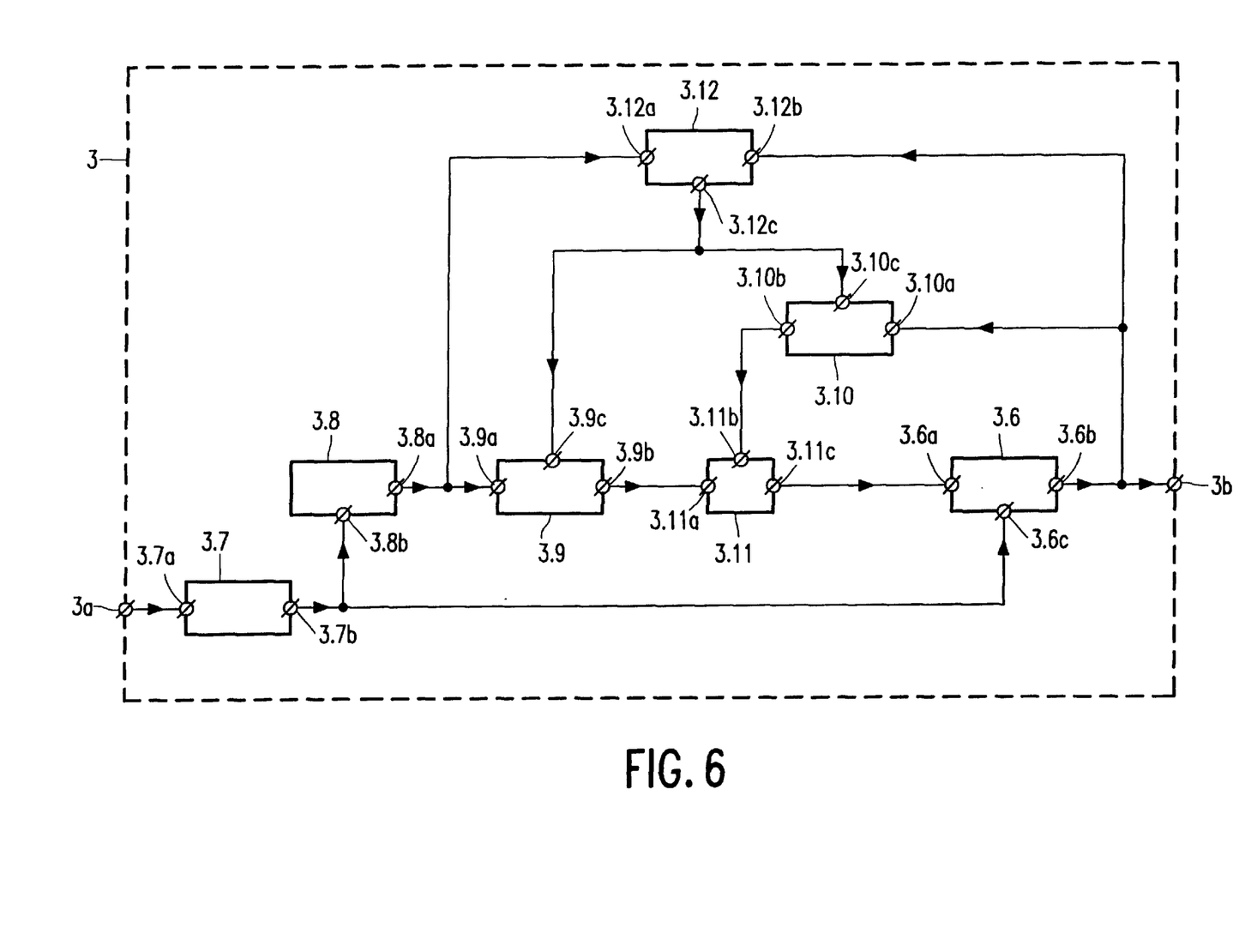

FIGS. 5 and 6 show embodiments of the control signal generator means that comprise further signal processing means. In these embodiments, the means for deriving an evaluation signal are identical to those described with reference to the FIGS. 3 and 4, respectively. These means are identified by the same reference numbers in the FIGS. 5 and 6. The control signal generator 3 further comprises first and second signal modification means; 3.9 and 3.10, signal combination means 3.11, storage means 3.6 and modification-control means 3.12. The first signal modification means 3.9 are adapted for multiplying a signal by a modification factor α. These signal modification means can, for instance, be an amplifier that amplifies by a (controllable) factor α. Note that α may be smaller than 1, in which case the amplifier attenuates. The input 3.9*a* of these means is coupled to the output of the counter, described with reference to the FIGS. 3 and 4, respectively. The second signal modification means 3.10 are adapted for multiplying a signal by a second modification factor β, which is equal to one minus the modification factor α. These signal modification means can, for instance, be an amplifier that amplifies by a (controllable) factor β. Note that β may be smaller than 1, in which case the amplifier attenuates, and/or negative, in which case the amplifier inverts. The input 3.10*a* of these means is coupled to the data output 3.6*b* of the storage means 3.6. The signal combination means 3.11 are adapted for summing the two signals received at its inputs. 3.11*a* and 3.11*b* and for providing the resulting signal at its output 3.11*c*. The first input 3.11*a* of these means is coupled to the output 3.9*b* of the first signal modification means 3.9, the second input 3.11*b* is coupled to the output 3.10*b* of the second signal modification means 3.10. The output 3.11*c* of the signal combination means 3.11 is coupled to the data input 3.6*a* of the storage means 3.6. The signal from the signal combination means 3.11 is stored by the storage means and provided at the data output 3.6*b* upon reception of a trigger signal, described with reference to the FIGS. 3 and 4, respectively, at the trigger input 3.6*c*. The data output 3.6*b* of the storage means is further coupled to the output 3*b* of the control signal generator 3 for providing the control signal to the presentation means 2. When said trigger signal is generated, as described hereinabove, the preceding evaluation period ends; the count-value of the counter (V1$_T$), which represents the average rate at which information units were received during that evaluation period, is multiplied by a modification factor α by the first signal modifying means 3.9 and added in the signal combination means 3.11 to the control signal of the preceding evaluation period (V2$_{T-1}$) that is multiplied by β (β=1−α) by the second signal modifying means 3.10. The signal resulting from this addition is stored in the storage means 3.6 and provided at the output 3*b* as the new control signal (V2$_T$), in response to which the scroll speed is controlled during the forthcoming period. The control signal is thus generated according to the formula:

$$V2_T = \alpha \times V1_T + (1-\alpha) \times V2_{T-1}$$

It is to be understood that other embodiments may acquire the same control signal by applying other signal processing means. It is, for instance, equally possible to generate the control signal by subtracting the signal V2$_{T-1}$ from the signal V1$_T$, multiplying the result by α and adding the signal V2$_{T-1}$; V2$_T$=α×(V1$_T$−V2$_{T-1}$)+V2$_{T-1}$. Such an implementation may be advantageous because it comprises only one multiplier. This and other optimizations of an embodiment do not depart from the scope of the invention.

The modification-control means 3.12 are adapted for controlling the modification factor α (and through that the second modification factor β=1−α) in response to the average rate of reception during the preceding evaluation period, as represented by the evaluation signal V1$_T$, and the scroll speed in that period, as represented by the control signal of that period V2$_{T-1}$. The setting of the modification factor α controls the response of the control signal:

- if the average rate of reception is lower than the scroll speed, the modification factor α is set to a value in the range 0≦α≦1 to make the control signal follow slowly the changes in the average rate of reception. If the scroll speed was low already and lowering it is not required to improve the readability of the presented messages, the modification factor α is set to 0 or close to 0. If the scroll speed was high with respect to a convenient reading speed, a decreasing reception rate is followed more rapidly, i.e. the modification factor α is set to 1 or close to 1, in order to lower the scroll speed as soon as possible, thereby quickly improving the readability of the presented messages.
- if the average rate of reception is equal to or slightly lower than the scroll speed, the modification factor α is set to 0. Thus, the scroll speed is kept at a constant level, because it is high enough to show the full messages in the available time, and not much higher than required for that.
- if the average rate of reception is higher than the scroll speed, the modification factor α is set to a value α>1 so that the control signal follows the average rate of reception rapidly and with an "overshoot" to compensate for the scroll speed being too low during the preceding period.

Figure 7:
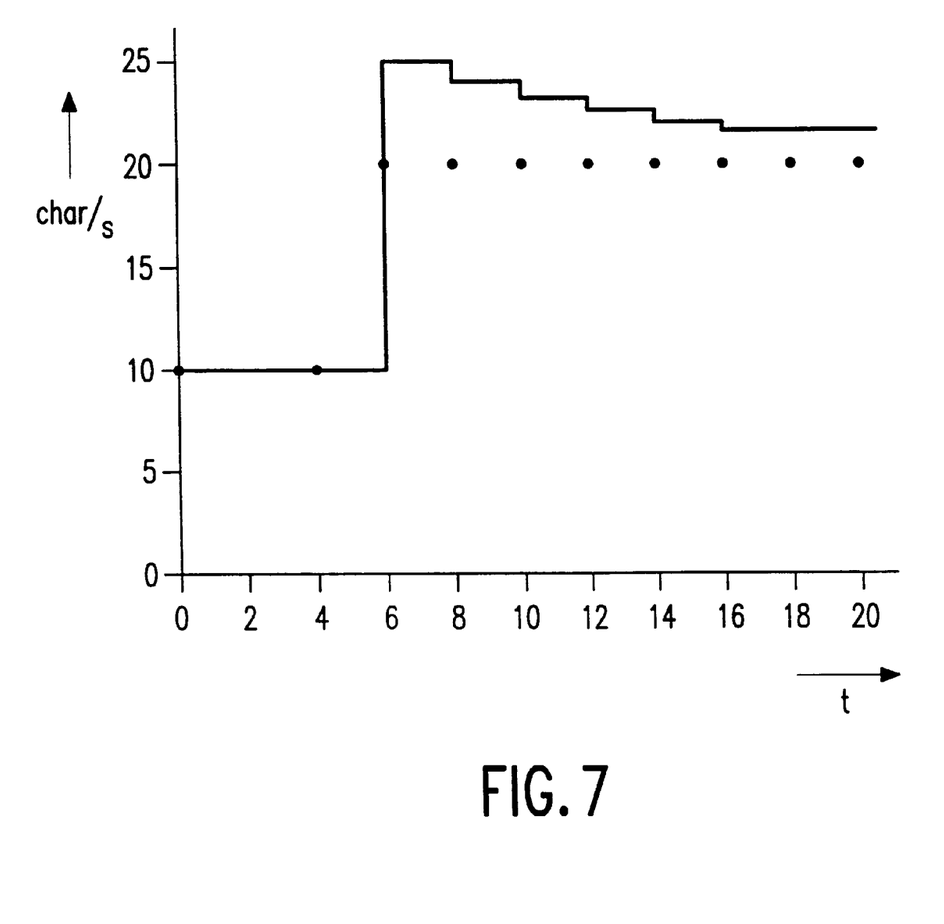
FIG. 7 shows an example of the response of the information display device to a sudden increase in the reception rate.

FIG. 7 shows an example of the response of the information display device to a sudden increase in the reception rate. In this graph, the abscissa is measured along a time scale in seconds, the ordinate is measured in characters per second for both the reception rate and the scroll speed. The average rate of reception is represented in the graph by dots, because its value is relevant only at those points in time where an evaluation is concluded. The scroll speed is represented by a solid line. It is assumed that messages, each comprising 40 information units representing 40 characters, are received and that the average rate of reception is evaluated after every reception of such a message. The average rate of reception equals the number of information units in a message, in casu 40, divided by the duration of the evaluation period, i.e. the time between the moments at which a message is received. This example starts from a stable situation, in which one message is received every four seconds and the scroll speed has reached a stable value of ten characters per second. At t=0 and t=4 again messages are received, continuing this stable situation, but then the reception rate increases to one such message every two seconds, i.e. 20 characters per second. At t=6 this becomes apparent. At this point in time, another 40 character become available while half of the previous message, 20 characters, is yet to be shown. The scroll speed will follow this change in reception rate from 10 to 20 characters per second, but first the lag of the presentation must be overcome by setting the scroll speed to a higher value. If the scroll speed would be set to 30 characters per second, i.e. α=2, the unseen half of the previous message (20 characters) plus the full new message (40 characters) would be shown in the forthcoming period of two seconds, but this scroll speed could be found unacceptably high. The overshoot may be set to a lesser value at the cost of affecting the synchronization of a number of the following messages. In the example shown in the graph, the scroll speed is set to 25 characters per second instead of 30, i.e. α=1.5 instead of α=2. The last 20 characters of the previous message plus 30 characters of the new message are presented in the forthcoming period of two seconds, leaving ten characters of the new message yet to be presented. Thus, the lag of the presentation has been halved in one period. After this overshoot reaction, the scroll speed will slowly approach the new reception rate; the modification factor is set, for instance, to α=0.2. This will result in the scroll speed becoming 24 characters per second at t=8 so that the lag is reduced to two characters at t=10. At t=12 the lag has been overcome, but the scroll speed is still slightly higher than necessary; it will continue to approach the current average rate of reception. When the scroll speed has approached the average rate of reception close enough, i.e. it is high enough to show the full messages in the available time and not much higher than required for that, the modification factor can be set to α=0, thus keeping the scroll speed constant. This is shown in the graph from t=16 onwards. It has the advantage for the reader that the presentation is smoother.

Figure 8:
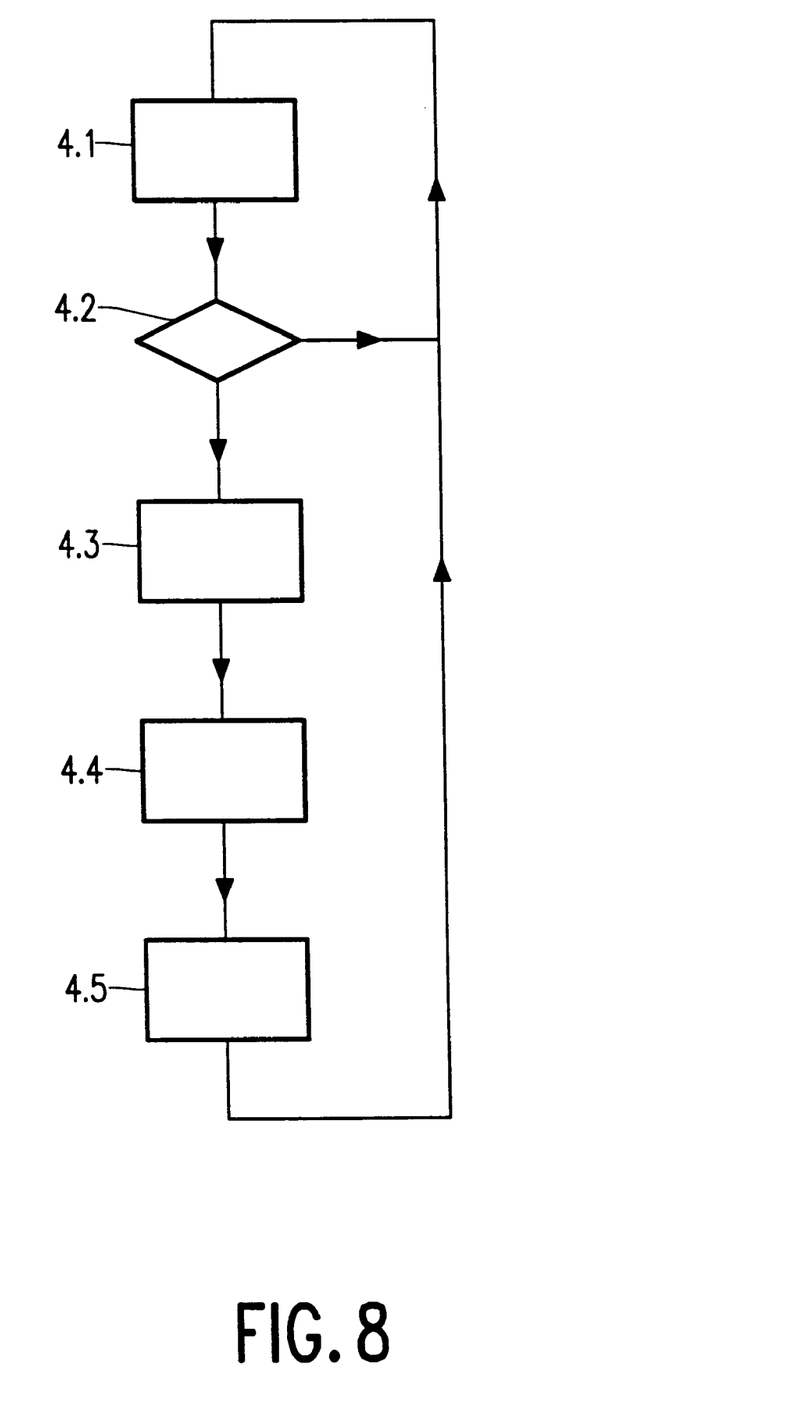
FIG. 8 shows, for an embodiment comprising a microcomputer, a flow chart for an extension and modification of the programme of that micro-computer.

The embodiments described hereinabove are described in terms of hardware means. It is, however, equally possible to implement such means in a software programme that controls the functions of a device, such as a micro-computer. In particular, the embodiments described with respect to FIGS. 3, 4, 5 and 6 are very well suited for such an implementation. In information display devices that have at least part of the presentation means 2 implemented in a micro-computer software programme, this invention may advantageously be embodied in that same micro-computer as an extension and modification of its programme. FIG. 8 shows an example of how this extension can be embedded in the micro-computer software programme:

Procedure 4.1 represents the "other tasks" that the micro-computer performs, such as the tasks belonging to a prior art information display device. In these "other tasks", the procedure for scrolling the information units must, according to this invention, be modified such that it is adapted for scrolling at a speed that can be controlled by the value of a parameter $V2_T$ that is provided by the present extension of the programme. Procedure 4.1 accesses the programme extension; procedures 4.2, 4.3, 4.4 and 4.5.

Procedure 4.2 tests whether or not a burst of information units has been received. If no burst of information units was received since the last test, the programme returns to the "other tasks" of procedure 4.1, but if a burst was received, it continues with procedure 4.3. The interaction described here of the procedures 4.1 and 4.2 is that of "polling". This means that procedure 4.2 is accessed recurrently, but not necessarily at regular intervals; it may be accessed whenever the "other tasks" have some spare time, provided that it is frequent enough to measure the period between bursts accurately enough. Alternatively, the interaction could be "interrupt driven", which means that the other tasks are interrupted and the programme extension is accessed as soon as a burst of information units is received. The detection of a burst being received is thus taken over by other means in the micro-computer, so that the procedure 4.2 can be omitted and the programme can jump, when triggered by an interrupt signal, directly to the procedure 4.3. The advantage of an interrupt-driven interaction is that no inaccuracy is added to the reception rate evaluation due to infrequent polling.

Procedure 4.3 corresponds to the generation of the evaluation signal $V1_T$. In this example, the average rate of reception is evaluated in a similar way as in the embodiment of FIG. 6. When this procedure starts, i.e. after the reception of a burst, a count-value is read from a counter which, embodied in the micro-computer, is incremented at a constant, relatively high rate. Then, the average rate of reception is calculated from the number of information units in the burst divided by the count-value. This calculation results in a value for the parameter $V1_T$ that is used in the procedures that follow.

After the count-value has been read, the counter is reset to zero and the evaluation of the next period starts.

Procedure 4.4 corresponds to the modification-control that is described with respect to FIGS. 5 and 6. This procedure determines the modification factors α and β according to predetermined rules that depend on the parameters $V1_T$, the average rate of reception that has just been evaluated, and $V2_{T-1}$, the control signal generated in the previous programme cycle. Examples of such predetermined rules have been described hereinabove. Advantageously, the value for β is set to one minus the value of α.

Procedure 4.5 corresponds to the generation of the control signal $V2_T$. The new value for the parameter $V2_T$ is calculated from the formula $V2_T=\alpha \times V1_T+\beta \times V2_{T-1}$. This value is stored for use in the next programme cycle and for use by the procedure that controls the scroll speed, so that that procedure can set the scroll speed accordingly.

After this, the programme returns to the "other tasks".

The invention thus relates to a device for displaying information units. The information units are received in bursts, at a rate that cannot be fully controlled by the display device. The device scrolls the received information through its display area, whereby the scroll speed is adapted in such a way that it is high enough to present the received information before the next information is expected, and not much higher than necessary for that. The device comprises means that generate a control signal $V2_T$ and provide it to the presentation means for controlling the scroll speed. These control signal generator means generate an evaluation signal $V1_T$ that represents the average rate at which information units are received during an evaluation period, and derive the control signal from that evaluating signal. In an embodiment of the invention, the control signal is generated according to the formula: $V2_T=\alpha \times V1_T+(1-\alpha) \times V2_{T-1}$. In a futher refinement of this embodiment, the modification factor α is adapted in response to changes in the rate at which information units are received. The information display device may, for example, be applied in an apparatus for retrieving information from a record carrier and/or a broadcast transmission.

Although the present invention has been described with respect to preferred embodiments thereof, it is to be understood that these are not limitative examples. Thus, various modifications may become apparent to those skilled in the art, without departing from the scope of the invention as defined in the appended claims. In the embodiments described with respect to FIGS. 3, 4, 5 and 6, a count-value of a counter is used for generating the evaluation signal ($V1_T$). In the embodiments of FIGS. 3 and 5, this results in the evaluation signal being proportional to the average rate of reception, while in the embodiments of FIGS. 4 and 6, the resulting evaluation signal is inversely proportional to the average rate of reception. When implementing particular evaluation means, it may be advantageous not to use the count-value in a straight-forward way, but to process it first in such a way that the resulting evaluation signal is better adapted to the characteristics of the means that apply that signal, such as the presentation means. The presentation means may, for instance, control the scroll speed in proportion or in inverse proportion to their input signal, or in any other way. The evaluation signal can be adapted to such characteristics by applying simple processing means, such as means that provide at their output a signal in inverse proportion to the signal at their input. Alternatively, such adaptations can be performed on the control signal ($V2_T$). Such adaptations may require that the rules for controlling the modification factors $\alpha$ and $\beta$, as set forth hereinabove, are adapted accordingly. It is within the capabilities of those skilled in the art to understand from this description of the invention how to make such adaptations. Therefore, such adaptations do not depart from the scope of the invention.

I claim:

1. An information display device, comprising:
   input means for receiving bursts of information units,
   presentation means, comprising a display area for displaying said information units, said presentation means including means for scrolling the information units through the display area at a specific scroll speed, and
   control signal generator means for generating a control signal, said control signal generator means comprising evaluation means for generating an evaluation signal representative of an average rate at which said information units are received at said input means, said control signal being derived from said evaluation signal,
   and wherein said presentation means control the scroll speed in response to said control signal.

2. The information display device as claimed in claim 1, wherein said evaluation means are adapted for averaging, during evaluation periods comprising specific periods of time, and for generating said evaluation signal which is representative of an average rate at which said information units are received during an evaluation period.

3. The information display device as claimed in claim 1, wherein said control signal is said evaluation signal.

4. The information display device as claimed in claim 1, wherein said control signal generator means further comprise signal processing means adapted for generating said control signal in response to said evaluation signal and a control signal that was generated previously.

5. The information display device as claimed in claim 2, wherein said control signal generator means further comprise signal processing means for generating, after an evaluation period, said control signal in response to the sum of said evaluation signal multiplied by a first modification factor ($\alpha$) and a preceding control signal multiplied by a second modification factor ($\beta$).

6. The information display device as claimed in claim 5, wherein the signal processing means are further adapted for setting the first modification factor to a value in the range $0 \leq \alpha \leq 1$ if the average rate of reception during a preceding evaluation period was lower than the scroll speed in that period, for setting the first modification factor to a value $\alpha > 1$ if the average rate of reception during a preceding evaluation period was higher than the scroll speed in that period, and for setting the second modification factor to a value substantially equal to one minus the first modification factor (i.e. $\beta = 1 - \alpha$).

7. The information display device as claimed in claim 5, wherein the signal processing means are further adapted for setting the modification factors to the values $\alpha = 0$ and $\beta = 1$ if the average rate of reception during a preceding evaluation period was less than a predetermined fraction lower than the scroll speed in that period.

8. The information display device as claimed in claim 2, wherein said evaluation periods have a fixed duration.

9. The information display device as claimed in claim 2, wherein the beginning and ending of said evaluation periods are controlled in response to the reception of a burst of information units.

10. The information display device as claimed in claim 1, further comprising buffer means for storing information units at the rate at which they are momentarily received at the input means and for emitting information units at a rate related to the scroll speed.

11. Apparatus for retrieving information units from a record carrier and/or a broadcast transmission comprising an information display device as claimed in claim 1.

12. The information display device as claimed in claim 1 wherein said input means receive bursts of information units that are not under control of a user of the information display device, and
   the control signal generator means includes a counter coupled to a storage device.

13. The information display device as claimed in claim 1 wherein, during evaluation time periods, said evaluation means average the information units and generate said evaluation signal which is determined by the average rate at which the information units are received during an evaluation period.

14. The information display device as claimed in claim 13 wherein said control signal generator means further comprises signal processing means responsive to said evaluation signal and to a control signal generated in the preceding evaluation period for generating a new control signal.

15. The information display device as claimed in claim 14 wherein the signal processing means further comprise:
   a first signal modifier which modifies the evaluation signal by a first modification factor ($\alpha$),
   a second signal modifier which modifies the preceding control signal by a second modification factor ($\beta$), and
   means coupled to said first and second signal modifiers for combining the modified evaluation signal and the modified preceding control signal so as to derive said control signal.

16. The information display device as claimed in claim 15 wherein the signal combining means comprises means for adding said modified signals, and
   said first signal modifier is adapted to adjust the first modification factor ($\alpha$) to a value in the range $0 \leq \alpha \leq 1$ if the average rate of reception during a preceding evaluation period was lower than the scroll speed in that period, and
   said second signal modifier is adapted to adjust the second modification factor ($\beta$) to a value $\beta = 1 - \alpha$.

17. The information display device as claimed in claim 16 wherein the first and second signal modifiers adjust the first and second modification factors ($\alpha$) and ($\beta$), respectively, to the values $\alpha=0$ and $\beta=1$ if the average rate of reception during a preceding evaluation period was less than a predetermined fraction lower than the scroll speed in that period.

18. The information display device as claimed in claim 6 wherein the signal processing means are arranged to set the modification factors to the values $\alpha=0$ and $\beta=1$ if the average rate of reception during a preceding evaluation period was less than a predetermined fraction lower than the scroll speed in that period.

19. The information display device as claimed in claim 13 wherein said evaluation periods have a fixed duration.

20. The information display device as claimed in claim 13 wherein the start and end of said evaluation periods are controlled in response to the reception of a burst of information units.

21. The information display device as claimed in claim 4 wherein the signal processing means includes means for generating the control signal in accordance with the formula $V2_T=\alpha \times V1_T+(\beta)V2_{T-1}$, where $V2_T$ is the new control signal, $V1_T$ is the evaluation signal, $V2_{T-1}$ is a preceding control signal, $\alpha$ is a modification factor by which the evaluation signal is modified and $\beta$ is a second modification factor by which the preceding control signal is modified, and $\beta=1-\alpha$.

22. The information display device as claimed in claim 4 wherein the signal processing means includes means for generating the control signal in accordance with the formula $V2_T=\alpha(V1_T-V2_{T-1})+V2_{T-1}$, where $V2_T$ is the new control signal, $V1_T$ is the evaluation signal, $V2_{T-1}$ is a preceding control signal, and $\alpha$ is a modification factor by which the evaluation signal is modified.

* * * * *